US011206303B2

(12) United States Patent
Nishioka et al.

(10) Patent No.: US 11,206,303 B2
(45) Date of Patent: Dec. 21, 2021

(54) IMAGE SHARING ASSISTANCE DEVICE, IMAGE SHARING SYSTEM, AND IMAGE SHARING ASSISTANCE METHOD

(71) Applicant: Mitsubishi Electric Corporation, Tokyo (JP)

(72) Inventors: Tetsuro Nishioka, Tokyo (JP); Yoshihiko Mori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/640,271

(22) PCT Filed: Oct. 18, 2017

(86) PCT No.: PCT/JP2017/037710
§ 371 (c)(1),
(2) Date: Feb. 19, 2020

(87) PCT Pub. No.: WO2019/077697
PCT Pub. Date: Apr. 25, 2019

(65) Prior Publication Data
US 2020/0366729 A1 Nov. 19, 2020

(51) Int. Cl.
*H04L 29/08* (2006.01)
*H04L 29/06* (2006.01)
(Continued)

(52) U.S. Cl.
CPC .......... *H04L 67/06* (2013.01); *G06T 7/0002* (2013.01); *H04L 65/601* (2013.01); *H04N 5/23206* (2013.01)

(58) Field of Classification Search
CPC .......... G06T 7/00; G06T 7/0002; G06T 7/80; G06T 7/90; G06T 7/97; H04N 5/00;
(Continued)

(56) References Cited

U.S. PATENT DOCUMENTS 8,643,662 B2 * 2/2014 Tran .................. H04N 21/4753
345/581
9,509,867 B2 * 11/2016 Camp, Jr. .......... H04N 1/00307
(Continued)

FOREIGN PATENT DOCUMENTS

JP 2002-267467 A 9/2002
JP 2006-171951 A 6/2006
(Continued)

OTHER PUBLICATIONS

Chinese Office Action issued in Patent Application No. 201780095392. 6, dated Oct. 23, 2020 with English translation.
(Continued)

*Primary Examiner* — Boris D Grijalva Lobos
(74) *Attorney, Agent, or Firm* — Birch, Stewart, Kolasch & Birch, LLP.

(57) ABSTRACT

A first evaluation-value calculation unit calculates, using data on a captured image outputted by an image-capturing unit, a first evaluation value related to an image quality of the captured image. An environment acquisition unit acquires environmental information indicating an image-capturing environment at the time the captured image is taken by the image-capturing unit. A second evaluation-value calculation unit calculates, using the environmental information acquired by the environment acquisition unit, a second evaluation value related to the image-capturing environment at the time the captured image is taken by the image-capturing unit. A transmission determination unit determines, on the basis of at least one of the first evaluation value and the second evaluation value, whether or not the data on the captured image is to be transmitted to a server.

13 Claims, 5 Drawing Sheets

(51) Int. Cl.
  *G06T 7/00* (2017.01)
  *H04N 5/232* (2006.01)
(58) Field of Classification Search
  CPC ............ H04N 5/76; H04N 5/765; H04N 5/77;
    H04N 5/183; H04N 5/23206; H04N
    21/41422; H04N 5/4223; H04L 65/00;
    H04L 65/601; H04L 65/602; H04L 67/00;
    H04L 67/06
  See application file for complete search history.

(56) References Cited

U.S. PATENT DOCUMENTS

| | | | |
|---|---|---|---|
| 2002/0128770 A1 | 9/2002 | Ooishi | |
| 2008/0211921 A1 | 9/2008 | Sako et al. | |
| 2009/0324020 A1* | 12/2009 | Hasebe | G06T 7/00 |
| | | | 382/115 |
| 2012/0300069 A1 | 11/2012 | Sako et al. | |
| 2012/0320224 A1* | 12/2012 | Miyoshi | H04N 5/23267 |
| | | | 348/207.1 |
| 2013/0306736 A1* | 11/2013 | Yeakley | G06K 19/06037 |
| | | | 235/472.01 |
| 2014/0223548 A1* | 8/2014 | Wassingbo | H04N 21/44204 |
| | | | 726/19 |
| 2015/0124111 A1 | 5/2015 | Izumihara et al. | |
| 2016/0284099 A1* | 9/2016 | Swaminathan | G06K 9/00671 |
| 2016/0353014 A1 | 12/2016 | Izumihara et al. | |
| 2017/0011270 A1 | 1/2017 | Kamada | |
| 2018/0004377 A1* | 1/2018 | Kitchen | H04L 63/101 |
| 2018/0255236 A1 | 9/2018 | Izumihara et al. | |

FOREIGN PATENT DOCUMENTS

| | | |
|---|---|---|
| JP | 2008-85548 A | 4/2008 |
| JP | 2008-182544 A | 8/2008 |
| JP | 2011-87221 A | 4/2011 |
| JP | 2014-238720 A | 12/2014 |
| JP | 2015-89060 A | 5/2015 |
| JP | 2017-34638 A | 2/2017 |
| WO | WO 2015/129045 A1 | 9/2015 |

OTHER PUBLICATIONS

International Search Report (PCT/ISA/210) issued in PCT/JP2017/037710, dated Nov. 28, 2017.

Japanese Office Action issued in Patent Application No. 2019-549046 with English Translation, dated Jan. 7, 2020.

* cited by examiner

IMAGE SHARING ASSISTANCE DEVICE, IMAGE SHARING SYSTEM, AND IMAGE SHARING ASSISTANCE METHOD

TECHNICAL FIELD

The present invention relates to an image sharing assistance device for transmitting data on a captured image to a server.

BACKGROUND ART

In Patent Literature 1, an image processing device is described which is provided with: an analysis unit for analyzing each of the captured images collected from image-capturing devices provided in respective multiple vehicles to thereby determine its visibility with respect to at least one of a road-structural element of a road and a structural element around the road; and an extraction unit for extracting from the captured images, an image that meets a visibility condition.

CITATION LIST

Patent Literature

Patent Literature 1: Japanese Patent Application Laid-open No. 2017-34638

SUMMARY OF INVENTION

Technical Problem

The image processing device of Patent Literature 1 is able to communicate with in-vehicle devices through a communication network. The in-vehicle devices each output, at prescribed intervals, captured-image information including the captured image by the image-capturing device provided in the vehicle, to the image processing device through the communication network. In this manner, the in-vehicle devices in Patent Literature 1 transmit all of their captured-image information including the captured images without selection thereof, to the image processing device, which results in a large communication load imposed on the communication network.

This invention has been made to solve the problem as described above, and an object of this invention is to provide an image sharing assistance device capable of reducing the communication load between the device and a server.

Solution to Problem

An image sharing assistance device according to the invention is a device for acquiring data on a captured image from an imaging element and transmitting the data on the captured image to a server, the image sharing assistance device characterized by comprising: an interface circuit to acquire environmental information indicating an image-capturing environment at the time the captured image is taken; and processing circuitry to calculate a first evaluation value related to an image quality of the captured image; to calculate, using the environmental information, a second evaluation value related to the image-capturing environment at the time the captured image is taken; and to determine, on the basis of the first evaluation value and the second evaluation value, whether or not the data on the captured image is to be transmitted to the server.

Advantageous Effects of Invention

According to the invention, whether or not the data on the captured image is to be transmitted to the server, is determined through calculation of the first evaluation value related to the image quality and the second evaluation value related to the image-capturing environment at the time the captured image is taken. Thus, it is possible to reduce the communication load between the image sharing assistance device and the server.

DESCRIPTION OF EMBODIMENTS

Hereinafter, for illustrating the invention in more detail, embodiments for carrying out the invention will be described with reference to the accompanying drawings.

Embodiment 1

Figure 1:
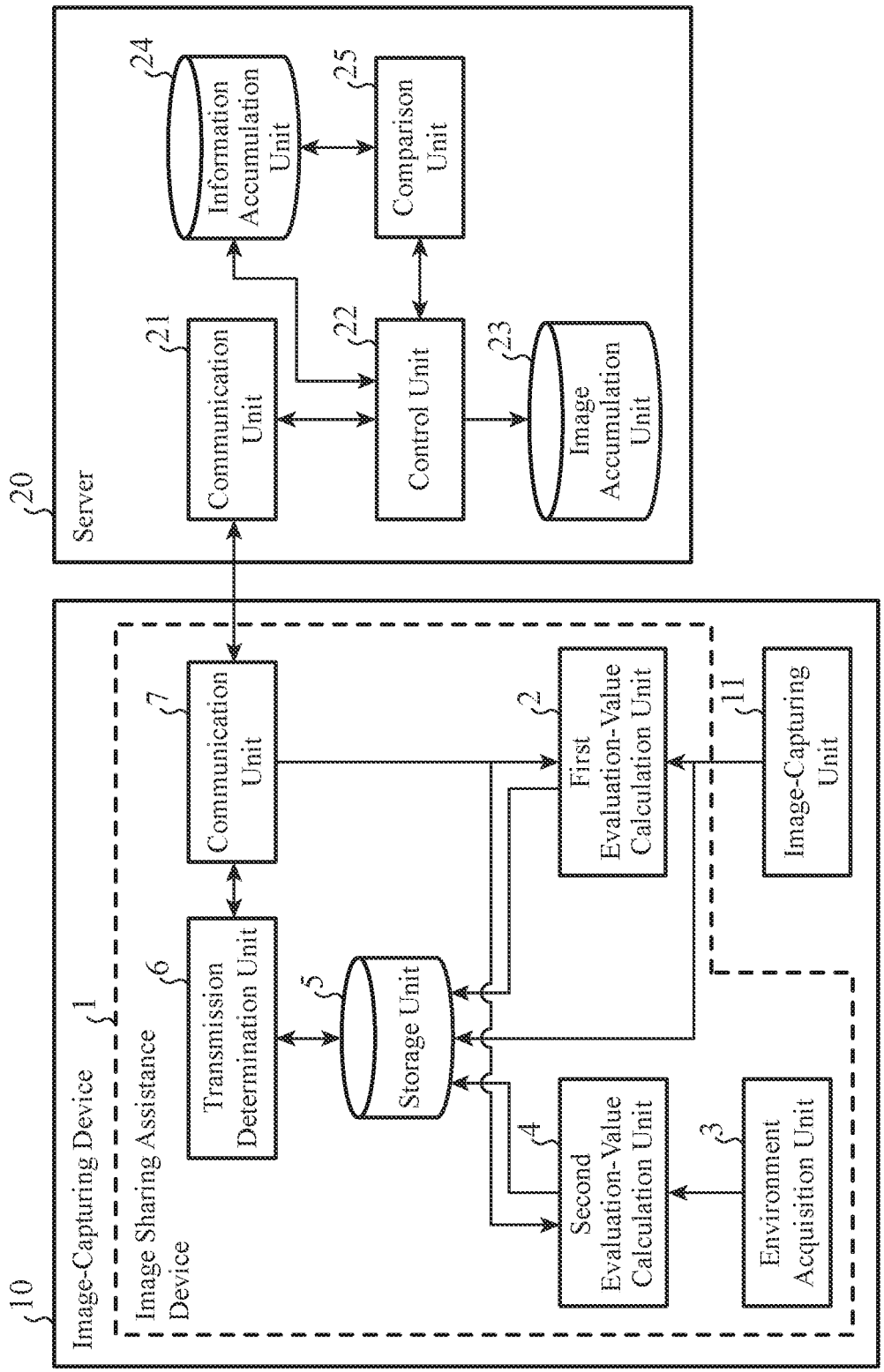
FIG. 1 is a configuration diagram of an image sharing system provided with an image sharing assistance device according to Embodiment 1.

FIG. 1 is a configuration diagram of an image sharing system provided with an image sharing assistance device 1 according to Embodiment 1. The image sharing system has the image sharing assistance device 1 and a server 20.

The image sharing assistance device 1 is built in an image-capturing device 10. The image-capturing device 10 is a device equipped in a vehicle, or a device placed on a roadside. More specifically, the image-capturing device 10 is, for example, a drive recorder or a roadside camera. Although only one image-capturing device 10 is illustrated in FIG. 1, there are multiple image-capturing devices 10 in the image sharing system.

The server 20 is placed at a place other than that of the image-capturing device 10. The image-capturing device 10 and the server 20 can communicate with each other through a network line, such as the Internet and the like.

The image-capturing device 10 has an image-capturing unit 11 and the image sharing assistance device 1.

The image-capturing unit 11 has an imaging element or the like, and outputs data on a captured image generated by capturing a road and an area around the road, to a first evaluation-value calculation unit 2 and a storage unit 5 in the image sharing assistance device 1.

The image sharing assistance device 1 acquires the data on the captured image from the image-capturing unit 11 and transmits the data on the captured image to the server 20. The image sharing assistance device 1 has the first evaluation-value calculation unit 2, an environment acquisition unit 3, a second evaluation-value calculation unit 4, the storage unit 5, a transmission determination unit 6 and a communication unit 7.

Using the data on the captured image outputted by the image-capturing unit 11, the first evaluation-value calculation unit 2 calculates a first evaluation value related to an image quality of the captured image. Specifically, the image quality means sharpness, brightness or the like, of an image. For example, the more the image is blurred as the sharpness decreases, the lower the first evaluation value becomes. Further, for example, the more the image is darkened as the brightness decreases, the lower the first evaluation value becomes. In the calculation process of the first evaluation value, to what extent the sharpness should be considered or to what extent the brightness should be considered, is depending on a first evaluation algorithm that the first evaluation-value calculation unit 2 uses for calculating the first evaluation value. The first evaluation algorithm that represents the calculation steps of the first evaluation value has been transmitted beforehand from the server 20 to the first evaluation-value calculation unit 2.

When the user, such as a road administrator and the like, who wants to view the captured image by the image-capturing device 10, registers an intended first evaluation algorithm in the server 20, the first evaluation algorithm will be transmitted to the first evaluation-value calculation unit 2 and thus the first evaluation-value calculation unit 2 will perform evaluation on the image quality in accordance with the first evaluation algorithm.

The first evaluation-value calculation unit 2 outputs the calculated first evaluation value to the storage unit 5.

The environment acquisition unit 3 acquires environmental information. The environmental information indicates an image-capturing environment at the time the captured image is taken by the image-capturing unit 11. Specifically, the environmental information is information related to an image-capturing position, a temperature, a degree of humidity, a vibration, weather, a mounting angle of the image-capturing unit 11, a self-diagnostic result of the image-capturing device 10, and/or the like. The environment acquisition unit 3 acquires the environmental information through an unshown GPS receiver, an unshown sensor, the Internet or the like, in synchronization, for example, with the image-capturing timing of the image-capturing unit 11. The environment acquisition unit 3 outputs the acquired environmental information to the second evaluation-value calculation unit 4. The self-diagnostic result of the image-capturing device 10 is a result showing a condition of the image-capturing device 10, as exemplified by the condition as to whether or not trouble has occurred in storing the captured image from the image-capturing unit 11 into the storage unit 5.

Using the environmental information outputted by the environment acquisition unit 3, the second evaluation-value calculation unit 4 calculates a second evaluation value related to the image-capturing environment at the time the captured image is taken by the image-capturing unit 11. The second evaluation-value calculation unit 4 outputs the calculated second evaluation value to the storage unit 5. At that time, the second evaluation-value calculation unit 4 outputs information on the image-capturing position, together with the second evaluation value, to the storage unit 5.

The image-capturing position means a position that is targeted by the image-capturing unit 11 for image capturing. Further, the information on the image-capturing position is information for specifying where the image-capturing position is placed, and is indicated, for example, in a latitude-longitude format.

In the calculation process of the second evaluation value, to what extent each factor as the environmental information, such as a temperature, a degree of humidity, a vibration and the like, should be considered, is depending on a second evaluation algorithm that the second evaluation-value calculation unit 4 uses for calculating the second evaluation value. Like the first evaluation algorithm, the second evaluation algorithm that represents the calculation steps of the second evaluation value has been transmitted beforehand from the server 20 to the second evaluation-value calculation unit 4.

Further, similarly to the first evaluation algorithm, when the user, such as a road administrator and the like, who wants to view the captured image by the image-capturing device 10, registers an intended second evaluation algorithm in the server 20, the second evaluation algorithm will be transmitted to the second evaluation-value calculation unit 4 and thus the second evaluation-value calculation unit 4 will perform evaluation on the image-capturing environment in accordance with the second evaluation algorithm. For example, when the user wants to know a road situation at a temperature of T degrees, a second evaluation algorithm is to be registered that causes the evaluation value to decrease as the temperature indicated by the environmental information becomes more divergent from T degrees. Further, for example, when the user wants to know a road situation in a rain, such as occurrence of puddles, and the like, a second evaluation algorithm is to be registered that causes the evaluation value to decrease if the weather indicated by the environmental information is not rainy.

The storage unit 5 stores the data on the captured image outputted by the image-capturing unit 11, the first evaluation value outputted by the first evaluation-value calculation unit 2, and the second evaluation value and the information on the image-capturing position outputted by the second evaluation-value calculation unit 4. At that time, the storage unit 5 stores them while associating the data on the captured image, the first evaluation value corresponding to the captured image, and the second evaluation value and the information on the image-capturing position corresponding to the captured image, with each other.

The transmission determination unit 6 determines whether or not the data on the captured image stored in the storage unit 5 is to be transmitted to the server 20, on the basis of at least one of the first evaluation value and the second evaluation value associated with the data on the captured image. With respect to the data on the captured image determined not to be transmitted to the server 20, the transmission determination unit 6 discards the data, together with the first evaluation value, the second evaluation value and the information on the image-capturing position that are associated with the data, by deleting them from the storage unit 5. Further, with respect to the data on the captured image determined to be transmitted to the server 20, the transmission determination unit 6 outputs the first evaluation value and the second evaluation value that are associated with the data, and summary information on the captured image, to the communication unit 7. In the summary information on the captured image, there are included the information on the image-capturing position associated with the data on the captured image, an image ID for distinguishing the captured image from another captured image, a device ID for distinguishing the image-capturing device 10 from another image-capturing device 10, and the like. The image ID is assigned to the captured image as an ID specific to the image when, for example, the storage unit 5 stores the data on the captured image. In this manner, at a stage prior to transmission to the server 20, the data on the captured image is subjected to selection processing by the transmission determination unit 6.

The transmission determination unit 6 may determine that the data on the captured image is to be transmitted to the server 20, when the first evaluation value exceeds a first set value or the second evaluation value exceeds a second set value; or may determine that the data on the captured image is to be transmitted to the server 20 when the first evaluation value exceeds the first set value and the second evaluation value exceeds the second set value. Like the first evaluation algorithm and the second evaluation algorithm, the first set value and the second set value have been transmitted beforehand from the server 20 to the transmission determination unit 6.

Further, the transmission determination unit 6, when having received a transmission request from the server 20 through the communication unit 7, outputs the data on the captured image indicated by the transmission request to the communication unit 7.

The communication unit 7 serves to make communication with the server 20. The communication unit transmits the first evaluation value, the second evaluation value, the summary information on the captured image, the data on the captured image and the like that are each outputted by the transmission determination unit 6, to the server 20. Further, the communication unit 7 receives the transmission request transmitted by the server 20 and outputs it to the transmission determination unit 6. Further, the communication unit 7 receives the first evaluation algorithm transmitted by the server 20 and outputs it to the first evaluation-value calculation unit 2, and receives the second evaluation algorithm transmitted by the server 20 and outputs it to the second evaluation-value calculation unit 4. Further, the communication unit 7 receives the first set value and the second set value transmitted by the server 20 and outputs them to the transmission determination unit 6.

The server 20 has a communication unit 21, a control unit 22, an image accumulation unit 23, an information accumulation unit 24 and a comparison unit 25.

The communication unit 21 serves to make communication with the image-capturing device 10. The communication unit 21 receives the first evaluation value, the second evaluation value, the summary information on the captured image, the data on the captured image and the like that are each transmitted by the image-capturing device 10, and outputs each of them to the control unit 22. Further, the communication unit 21 transmits the transmission request outputted by the control unit 22 to the image-capturing device 10. Further, the communication unit 21 transmits the first evaluation algorithm, the second evaluation algorithm, the first set value and the second set value that are outputted by the control unit 22, to the image-capturing device 10.

The control unit 22 outputs the data on the captured image outputted by the communication unit 21, to the image accumulation unit 23. Further, the control unit outputs the first evaluation value, the second evaluation value and the summary information on the captured image that are outputted by the communication unit 21, to the information accumulation unit 24. Further, using a comparison result outputted by the comparison unit 25, the control unit 22 generates the transmission request that requires the image-capturing device 10 to transmit the data on the captured image to the server 20. The control unit 22 outputs the generated transmission request to the communication unit 21. Further, the control unit 22 reads out the first evaluation algorithm, the second evaluation algorithm, the first set value and the second set value that are accumulated, for example, in the information accumulation unit 24, and outputs them to the communication unit 21.

The image accumulation unit 23 accumulates the data on the captured image outputted by the control unit 22.

The information accumulation unit 24 accumulates the first evaluation value, the second evaluation value and the summary information on the captured image that are outputted by the control unit 22. Also, the information accumulation unit 24 is employed to accumulate the first evaluation algorithm, the second evaluation algorithm, the first set value and the second set value.

Using the first evaluation values, the second evaluation values and the pieces of summary information on a captured image that are accumulated in the information accumulation unit 24, the comparison unit 25 compares the captured images taken at the same image-capturing position with each other in accordance with their evaluation values, and then outputs information indicating which captured image has the highest evaluation, as the comparison result, to the control unit 22. Note that the meaning of "the same image-capturing position" is not necessarily to be exactly the same image-capturing position, and includes a case where positions can be regarded as almost the same, as exemplified by a case where they are apart from each other only by several meters.

Next, hardware configuration examples of the image sharing assistance device 1 will be described using FIG. 2A and FIG. 2B.

The functions of the first evaluation-value calculation unit 2, the second evaluation-value calculation unit 4 and the transmission determination unit 6 are implemented by a processing circuit. The processing circuit may be dedicated hardware, or may be a Central Processing Unit (CPU) which executes programs stored in a memory. The CPU is referred also to as a central processing device, a processing device, an arithmetic device, a microprocessor, a microcomputer, a processor or a Digital Signal Processor (DSP). Further, the environment acquisition unit 3 is implemented by an interface circuit for acquiring the environmental information from outside the image sharing assistance device 1. Further, like a memory 102 to be described later, the storage unit 5 is implemented by a semiconductor memory, a disk-like storage medium or the like. Further, the communication unit 7 is implemented by a communication device that is compatible with one of various communication standards, such as Long Term Evolution (LTE) and the like.

Figure 2A:
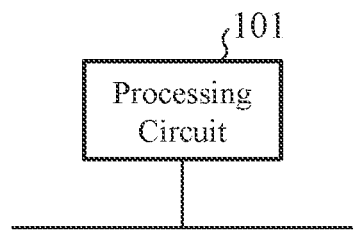
FIG. 2A and FIG. 2B are diagrams each showing a hardware configuration example of the image sharing assistance device according to Embodiment 1.

FIG. 2A is a diagram showing a hardware configuration example when the functions of the first evaluation-value calculation unit 2, the second evaluation-value calculation unit 4 and the transmission determination unit 6 are implemented by a processing circuit 101 as dedicated hardware. The processing circuit 101 is, for example, a single circuit, a composite circuit, a programmed processor, a parallel-programmed processor, an Application Specific Integrated Circuit (ASIC), a Field Programmable Gate Array (FPGA) or any combination thereof. The functions of the first evaluation-value calculation unit 2, the second evaluation-value calculation unit 4 and the transmission determination unit 6 may be implemented by two or more processing circuits 101 in combination, or the functions of the respective units may be implemented by one processing circuit 101.

Figure 2B:
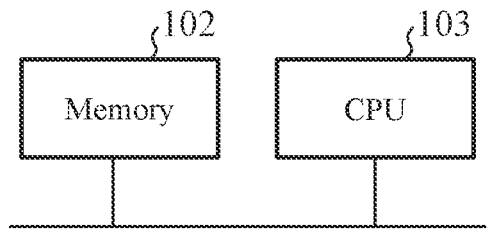

FIG. 2B is a diagram showing a hardware configuration example when the functions of the first evaluation-value calculation unit 2, the second evaluation-value calculation unit 4 and the transmission determination unit 6 are implemented by a CPU 103 which executes programs stored in the memory 102. In this case, the functions of the first evaluation-value calculation unit 2, the second evaluation-value calculation unit 4 and the transmission determination unit 6 are implemented by software, firmware or a combination of software and firmware. The software and the firmware are each written as a program(s) and stored in the memory 102. The CPU 103 reads out and executes the programs stored in the memory 102 to thereby implement the functions of the first evaluation-value calculation unit 2, the second evaluation-value calculation unit 4 and the transmission determination unit 6. Namely, the image sharing assistance device 1 has the memory 102 for storing the programs and the like by which Steps ST1 to ST9 shown in a flowchart of FIG. 3 to be described later, will be eventually executed. Further, it can also be said that these programs are programs for causing a computer to execute procedures or methods used by the first evaluation-value calculation unit 2, the second evaluation-value calculation unit 4 and the transmission determination unit 6. Here, the memory 102 is, for example, a non-volatile or volatile semiconductor memory, such as a Random Access Memory (RAM), a Read Only Memory (ROM), a flash memory, an Erasable Programmable ROM (EPROM), an Electrically Erasable Programmable ROM (EEPROM) and the like; or a disk-like storage medium, such as a magnetic disc, a flexible disc, an optical disc, a compact disc, a mini disc, a Digital Versatile Disc (DVD) and the like.

It is noted that the functions of the first evaluation-value calculation unit 2, the second evaluation-value calculation unit 4 and the transmission determination unit 6 may be implemented partly by dedicated hardware and partly by software or firmware. For example, it is allowable that, with respect to the transmission determination unit 6, its function is implemented by a processing circuit as dedicated hardware, whereas, with respect to the first evaluation-value calculation unit 2 and the second evaluation-value calculation unit 4, their functions are implemented by a processing circuit reading out and executing programs stored in a memory.

In this manner, the processing circuit can implement the functions of the first evaluation-value calculation unit 2, the second evaluation-value calculation unit 4 and the transmission determination unit 6 by hardware, software, firmware or any combination thereof.

It is noted that the control unit 22 and the comparison unit 25 in the server 20 can also be implemented, like the first evaluation-value calculation unit 2, the second evaluation-value calculation unit 4 and the transmission determination unit 6 in the image sharing assistance device 1, by a processing circuit 101 shown in FIG. 2A, or a memory 102 and a CPU 103 shown in FIG. 2B. Further, the communication unit 21 in the server 20 can be implemented by a communication device similar to that for the communication unit 7. Further, each of the image accumulation unit 23 and the information accumulation unit 24 in the server 20 can be implemented, like the memory 102, by a semiconductor memory, a disk-like storage medium or the like.

Figure 3:
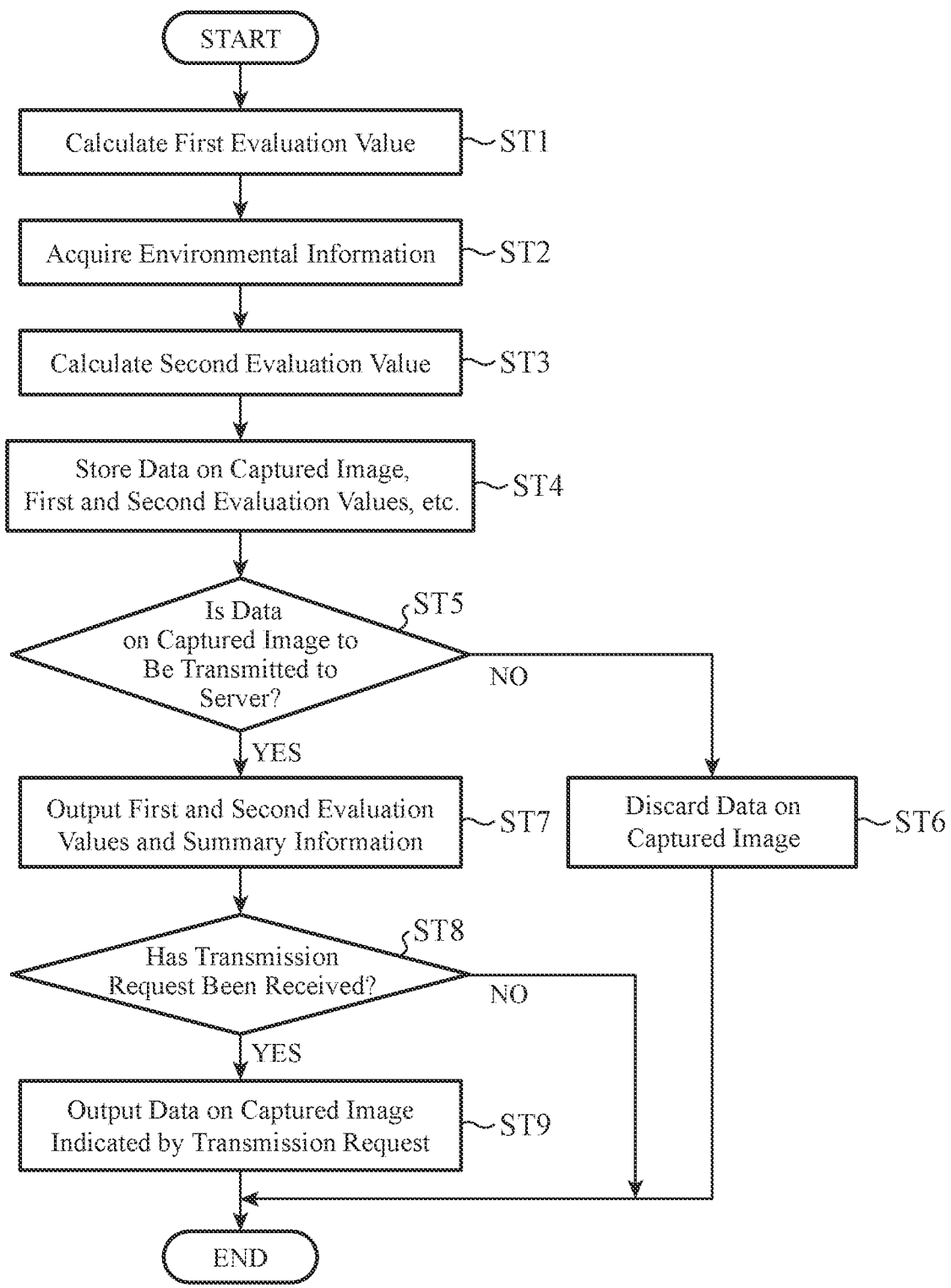
FIG. 3 is a flowchart showing processing by the image sharing assistance device, according to Embodiment 1.
Figure 4:
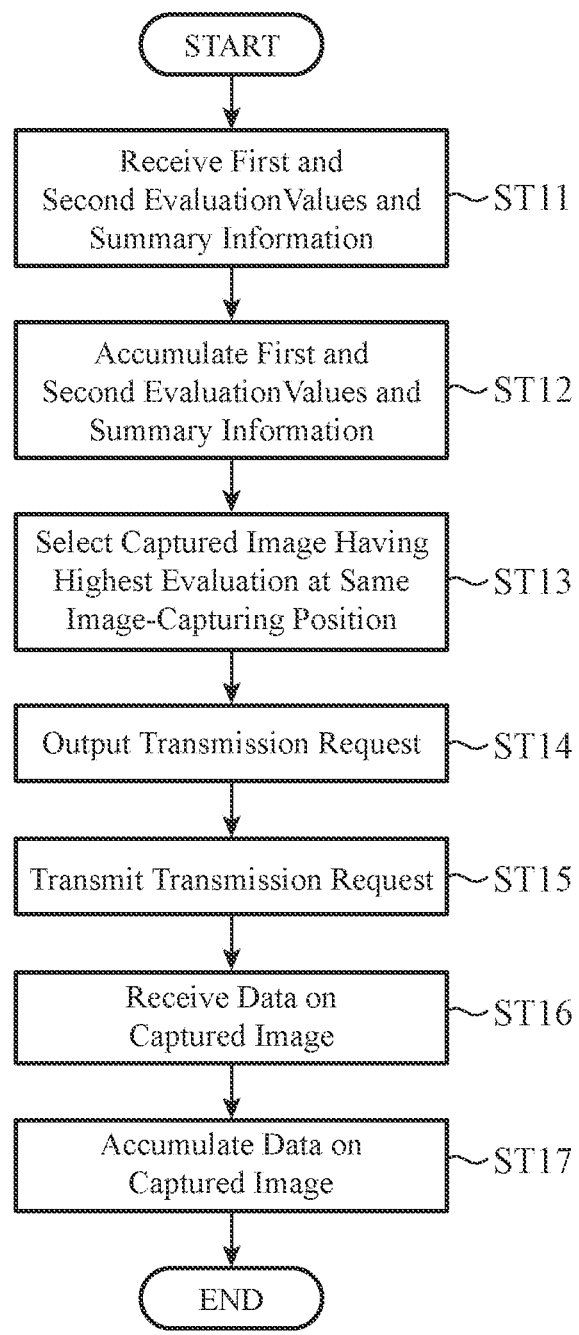
FIG. 4 is a flowchart showing processing by a server, according to Embodiment 1.

Next, processing to be performed in the image sharing system configured as described above, will be described using flowcharts shown in FIG. 3 and FIG. 4. In FIG. 3 and FIG. 4, description will be made about a case, as an example, in which image-capturing devices A and B each exist as the image-capturing device 10. The image-capturing device A is one of multiple roadside cameras each provided for making fixed-point observation of a road, and the image-capturing device B is one of drive recorders equipped in respective multiple vehicles traveling on the road. Many image-capturing devices 10 other than the image-capturing device A and the image-capturing device B may possibly be present in the image sharing system; however, for simplifying the description, here, let's consider focusing on the two devices of the image-capturing device A and the image-capturing device B.

FIG. 3 shows processing to be performed by the image sharing assistance device 1 in each of the image-capturing devices A and B, and FIG. 4 shows processing to be performed by the server 20.

The image-capturing unit 11 in each image-capturing device 10 is periodically capturing a road and an area around the road, and outputting the data on each captured image to the first evaluation-value calculation unit 2 and the storage unit 5.

Using the data on the captured image outputted by the image-capturing unit 11, the first evaluation-value calculation unit 2 calculates the first evaluation value related to the image quality of the captured image (Step ST1). The first evaluation-value calculation unit 2 outputs the calculated first evaluation value to the storage unit 5.

Further, the environment acquisition unit 3 acquires the environmental information (Step ST2). The environment acquisition unit 3 outputs the acquired environmental information to the second evaluation-value calculation unit 4.

Using the environmental information outputted by the environment acquisition unit 3, the second evaluation-value calculation unit 4 calculates the second evaluation value related to the image-capturing environment at the time the captured image is taken by the image-capturing unit 11 (Step ST3). The second evaluation-value calculation unit 4 outputs the calculated second evaluation value, together with the information on the image-capturing position, to the storage unit 5.

The storage unit 5 stores the data on the captured image outputted by the image-capturing unit 11, the first evaluation value outputted by the first evaluation-value calculation unit 2, and the second evaluation value and the information on the image-capturing position outputted by the second evaluation-value calculation unit 4, while associating them with each other (Step ST4).

Note that, in Step ST4, the storage unit 5 only has to store the data on the captured image, the first evaluation value corresponding to the captured image, and the second evaluation value and the information on the image-capturing position corresponding to the captured image, while associating them with each other. Thus, Step ST1 may be executed concurrently with Step ST2 or Step ST3, or may be executed after Step ST2 or Step ST3.

Subsequently, the transmission determination unit 6 determines whether or not the data on the captured image stored in the storage unit 5 is to be transmitted to the server 20 (Step ST5).

When having determined that the data on the captured image is not to be transmitted to the server 20 (Step ST5; NO), the transmission determination unit 6 discards the data on the captured image, together with the first evaluation value, the second evaluation value and the information on the image-capturing position that are associated with the data, by deleting them from the storage unit 5 (Step ST6).

In contrast, when having determined that the data on the captured image is to be transmitted to the server 20 (Step ST5; YES), the transmission determination unit 6 outputs the first evaluation value and the second evaluation value that are associated with the data on the captured image determined to be transmitted, and the summary information on the captured image, to the communication unit 7 (Step ST7). Accordingly, the first evaluation value, the second evaluation value and the summary information on the captured image are transmitted through the communication unit 7 to the server 20.

Thereafter, the transmission determination unit 6 determines whether or not to have received the transmission request through the communication unit 7 from the server 20 (Step ST8).

The first evaluation value, the second evaluation value and the summary information on the captured image transmitted by the processing in Step ST7, are received, as shown in FIG. 4, by the communication unit 21 in the server 20 (Step ST11). The communication unit 21 outputs the received first evaluation value, second evaluation value and summary information on the captured image, to the control unit 22.

Subsequently, the control unit 22 outputs the first evaluation value, the second evaluation value and the summary information on the captured image that are received by the communication unit 21, to the information accumulation unit 24 to thereby accumulate them in a state of being associated with each other (Step ST12).

Subsequently, using the first evaluation values, the second evaluation values and the pieces of summary information on a captured image that are accumulated in the information accumulation unit 24, the comparison unit 25 compares with each other the first evaluation values and the second evaluation values of the multiple captured images taken at the same image-capturing position, and thereby selects the captured image that has the highest evaluation (Step ST13). For example, the comparison unit 25 selects the captured image having the highest mean value of the first evaluation value and the second evaluation value. Instead, the comparison unit 25 may select the captured image having the highest first evaluation value, or may select the captured image having the highest second evaluation value. The comparison unit 25 outputs the comparison result including the image ID and the device ID indicated in the summary information on the thus-selected captured image, to the control unit 22.

For example, let's assume a case where both the image-capturing device A and the image-capturing device B capture images at an image-capturing position X1, and the captured image by the image-capturing device A has a low sharpness due to dewfall or the like and is thus blurred, whereas the captured image by the image-capturing device B has a high sharpness and is thus clear. In this case, the first evaluation value that the image-capturing device A calculates and transmits to the server 20, is lower than the first evaluation value that the image-capturing device B calculates and transmits to the server 20, so that the comparison unit 25 recognizes that the captured image by the image-capturing device B has a higher evaluation, in terms of the first evaluation value.

For further example, let's assume a case where the second evaluation algorithm used both in the image-capturing device A and the image-capturing device B is an algorithm by which the evaluation becomes higher if the image-capturing environment is rainy, and the weather at the time the image-capturing device A takes the captured image is sunny, whereas the weather at the time the image-capturing device B takes the captured image is rainy. In this case, the second evaluation value that the image-capturing device A calculates and transmits to the server 20, is lower than the second evaluation value that the image-capturing device B calculates and transmits to the server 20, so that the comparison unit 25 recognizes that the captured image by the image-capturing device B has a higher evaluation, in terms of the second evaluation value.

Subsequently, using the comparison result outputted by the comparison unit 25, the control unit 22 generates the transmission request that requires the image-capturing device 10 corresponding to the device ID indicated in the comparison result, to transmit to the server 20 the data on the captured image corresponding to the image ID indicated in the comparison result, and then outputs the request to the communication unit 21 (Step ST14). In the transmission request, information which enables the image-capturing device 10 to identify the captured image, such as the image ID of the captured image selected by the comparison unit 25, and the like, is included.

Subsequently, the communication unit 21 transmits the transmission request for the captured image outputted by the control unit 22, to the image-capturing device 10 (Step ST15).

As shown in FIG. 3, when having received the transmission request through the communication unit 7 (Step ST8; YES), the transmission determination unit 6 reads out from the storage unit 5 the data on the captured image corresponding to the image ID indicated in the received transmission request, and then outputs the data to the communication unit 7 (Step ST9). Accordingly, the data on the captured image required by the server 20 is transmitted through the communication unit 7 to the server 20.

In contrast, when the transmission determination unit 6 has not received the transmission request (Step ST8; NO), the data on the captured image is not transmitted from the image-capturing device 10 to the server 20.

As shown in FIG. 4, the data on the captured image transmitted by the processing in Step ST9 is received by the communication unit 21 in the server 20 (Step ST16). The communication unit 21 outputs the received data on the captured image to the control unit 22.

Subsequently, the control unit 22 outputs the data on the captured image received by the communication unit 21, to the image accumulation unit 23 to be accumulated therein (Step ST17).

As just described, in the system in which captured images are collected to the server 20 from the multiple image-capturing devices 10 through a network line, to thereby share the captured images, the image sharing assistance device 1 serves to assist in selection as to which image-capturing device 10's captured image should be shared.

Since the two types of evaluation values, namely, the first evaluation value and the second evaluation value, are calculated by the image sharing assistance device 1, it is possible for the transmission determination unit 6 in the image-capturing device 10 and the comparison unit 25 in the server 20, to perform captured-image selection processing using selectively the first evaluation value and the second evaluation value, as exemplified by a case where both of the two types of calculated evaluation values are employed, or a case where only either one of the two types of calculated evaluation values is employed.

Since the captured image whose data is allowed to be transmitted is determined by the transmission determination unit 6, a captured image not satisfying a specific criterion is not subject to transmission to the server 20, so that the communication load imposed on the network line between the image sharing assistance device 1 and the server 20 is reduced. Furthermore, with respect to the captured image subject to transmission to the server 20, the image sharing assistance device 1 once transmits the first evaluation value, the second evaluation value and the summary information on the captured image that have a small data volume, to the server 20 and thereafter, only when having received the transmission request from the server 20, transmits thereto the data on the captured image having a large data volume. Thus, the communication load is further reduced.

Then, eventually, among the captured images at the same image-capturing position, only the captured image which most meets the requirements from the user such as a road administrator or the like, is accumulated in the image accumulation unit 23 of the server 20.

The user such as a road administrator or the like can acquire the data on the captured image accumulated in the image accumulation unit 23 of the server 20, through a network line, such as the Internet and the like, to thereby employ the data for maintenance of road infrastructure, recognition of the traffic condition, and the like.

Note that, it is allowable that the transmission determination unit 6 reads out, together with the data on the captured image, from the storage unit 5, the first evaluation value and the second evaluation value of the captured image, and then outputs them to the communication unit 7 in Step ST9, so that the communication unit 7, at the time of transmitting the data on the captured image to the server 20, transmits together the first evaluation value and the second evaluation value of the captured image, to the server 20. This enables the control unit 22 to cause, in Step ST17, the data on the captured image to be accumulated in the image accumulation unit 23 in a state of being associated with the first evaluation value and the second evaluation value, so that the first evaluation value and the second evaluation value can be further provided to the user who requests provision of the data on the captured image.

Further, in the foregoing, the image sharing assistance device 1 is built in the image-capturing device 10. However, the image sharing assistance device 1 may be a device made separately from the image-capturing device 10. The image sharing assistance device 1 in this case is provided in such a way as to be capable of receiving the data on the captured image from the image-capturing device 10. For example, the image sharing assistance device 1 may be a mobile terminal such as a smartphone or the like which is brought into a vehicle and communicably connected to a drive recorder.

Further, in the foregoing, the image-capturing targets for the image-capturing device 10 are a road and an area around the road. However, the image-capturing target for the image-capturing device 10 may be an object other than the road and the area around the road.

Consequently, according to Embodiment 1, the first evaluation-value calculation unit 2 and the second evaluation-value calculation unit 4 are provided, and thereby the two types of evaluation values, namely, the first evaluation value related to the image quality and the second evaluation value related to the image-capturing environment at the time the captured image is taken, are calculated. Thus, it is possible for the transmission determination unit 6 in the image-capturing device 10 and the comparison unit 25 in the server 20, to perform captured-image selection processing using selectively the first evaluation value and the second evaluation value. Since the captured image whose data is allowed to be transmitted is determined by the transmission determination unit 6, a captured image not satisfying the specific criterion is not subject to transmission to the server 20, so that the communication load imposed on the network line between the image sharing assistance device 1 and the server 20 is reduced. Further, the image sharing system provided with the image sharing assistance device 1 can provide to the user, the captured image which is most suited to the image quality and the image-capturing environment at the time the image is taken, both of which are desired by the user.

Further, with respect to the data on the captured image determined to be transmitted to the server 20, first, the image-capturing device 10 transmits the first evaluation value, the second evaluation value and the summary information on the captured image that are associated with the data on the captured image, to the server 20 and thereafter, only when having received the transmission request from the server 20, transmits thereto the data on the captured image. The data on the captured image is larger in data volume than the first evaluation value and the like. Thus, by a configuration in which only the data on the captured image for which the transmission request has been issued is transmitted to the server 20, the communication load imposed on the network line between the image sharing assistance device 1 and the server 20 can be further reduced.

In another aspect, the transmission determination unit 6, when the first evaluation value exceeds the first set value or the second evaluation value exceeds the second set value, determines that the data on the captured image is to be transmitted to the server 20. This makes it possible that as many pieces of data on a captured image as possible are determined to be transmitted to the server 20, while reducing the communication load imposed on the network line between the image sharing assistance device 1 and the server 20.

In another aspect, the transmission determination unit 6, when the first evaluation value exceeds the first set value and the second evaluation value exceeds the second set value, determines that the data on the captured image is to be transmitted to the server 20. This makes it possible to more stringently select the data on the captured image to be determined to be transmitted to the server 20.

In another aspect, the communication unit 7 is included which, at the time of transmitting the data on the captured image to the server 20, transmits together the first evaluation value and the second evaluation value to the server 20. This makes it possible to further provide the first evaluation value and the second evaluation value, together with the data on the captured image, to the user.

In another aspect, the first evaluation-value calculation unit 2 calculates the first evaluation value by using the first evaluation algorithm transmitted from the server 20. This makes it possible to reflect the user's requirement easily by changing the first evaluation algorithm registered in the server 20.

In another aspect, the second evaluation-value calculation unit 4 calculates the second evaluation value by using the second evaluation algorithm transmitted from the server 20. This makes it possible to reflect the user's requirement easily by changing the second evaluation algorithm registered in the server 20.

Embodiment 2

In Embodiment 2, description will be made about an embodiment in which, when the server 20 cannot receive the data on the captured image from the image-capturing device 10 to which the transmission request is transmitted, the server 20 receives as a substitute for the data, data on a captured image from another image-capturing device 10.

As a configuration diagram of an image sharing system of Embodiment 2, FIG. 1 is referred to. Further, for the components having functions that are the same as or equivalent to those of the components already described in Embodiment 1, the same reference numerals are given, so that description thereof will be omitted or simplified as appropriate.

When, within a set time period from the transmission of the transmission request, the control unit 22 in the server 20 cannot obtain the data on the captured image that the control unit attempts to obtain using the transmission request, the control unit 22 outputs to the communication unit 21, another transmission request to obtain data on a captured image that has the second best evaluation value next to the above captured image.

Figure 5:
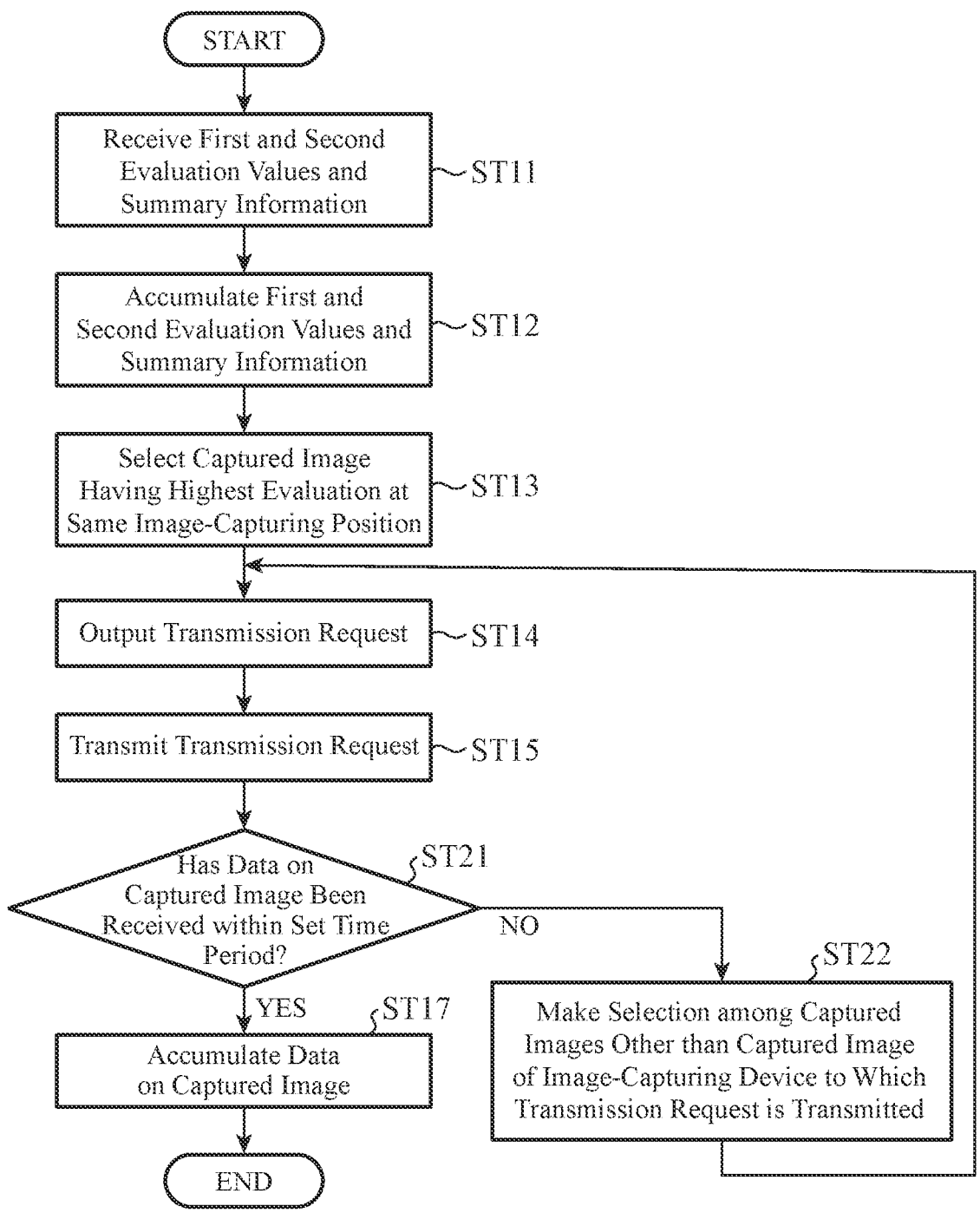
FIG. 5 is a flowchart showing processing by a server, according to Embodiment 2.

Next, processing to be performed in the image sharing system of Embodiment 2 will be described using flowcharts shown in FIG. 3 and FIG. 5. In FIG. 3 and FIG. 5, description will be made about a case, as an example, in which image-capturing devices A, B and C each exist as the image-capturing device 10. The image-capturing device A is one of multiple roadside cameras each provided for making fixed-point observation of a road, and each of the image-capturing device B and the image-capturing device C is one of drive recorders equipped in respective multiple vehicles traveling on the road. Many image-capturing devices 10 other than the image-capturing device A, the image-capturing device B and the image-capturing device C, may possibly be present in the image sharing system; however, for simplifying the description, here, let's consider focusing on the three devices of the image-capturing device A, the image-capturing device B and the image-capturing device C.

FIG. 3 shows processing to be performed by the image sharing assistance device 1 in each of the image-capturing devices A to C, and FIG. 5 shows processing to be performed by the server 20. For the steps of performing the same processes as or equivalent processes to the steps already described in Embodiment 1, the same reference numerals are given, so that description thereof will be omitted or simplified as appropriate.

Let's assume that, as a result of a series of processes in Steps ST11 to ST15 in FIG. 5, the transmission request is transmitted that requires, for example, the data on the captured image taken by the image-capturing device B from among the captured images taken by the image-capturing devices A to C at an image-capturing position X2.

Subsequently, the control unit 22 determines whether or not to have received the data on the captured image through the communication unit 21 within the set time period from the transmission of the transmission request (Step ST21). The control unit 22 cannot obtain the data on the captured image within the set time period, when, for example, the vehicle equipped with the image-capturing device B has entered a zone in which radio waves for making connection to a network line do not exist.

When the control unit 22 can obtain the data on the captured image within the set time period (Step ST21; YES), the control unit 22 outputs the data on the captured image to the image accumulation unit 23 to be accumulated therein (Step ST17).

In contrast, when the control unit 22 cannot obtain the data on the captured image within the set time period (Step ST21; NO), the comparison unit 25 refers to the information accumulation unit 24. Thereby, with respect to the captured images at the image-capturing position X2, the comparison unit 25 compares with each other the first evaluation values and also the second evaluation values of the captured images taken by the image-capturing devices 10 other than the image-capturing device B to which the transmission request is transmitted, and thereby selects the captured image that has the highest evaluation (Step ST22). The comparison unit 25 outputs the comparison result including the image ID and the device ID indicated in the summary information on the thus-selected captured image, to the control unit 22. Here, assume that a captured image is selected that is taken by the image-capturing device A, which is one of the image-capturing devices A and C that are the image-capturing devices 10 other than the image-capturing device B.

After the process in Step ST22, the process in Step ST14 is performed.

Consequently, according to Embodiment 2, like in Embodiment 1, the image sharing assistance device 1 can reduce the communication load imposed on the network line between the device and the server 20. Further, when the server 20 cannot obtain the data on the captured image required by the transmission request, the image sharing system of Embodiment 2 attempts to obtain a captured image which meets the user's requirement next to the above captured image, so that it is possible to prevent a situation in which no captured images can be provided to the user, and to provide to the user the captured image which meets as much as possible the user's requirement.

It should be noted that unlimited combination of the embodiments, modification of any component in the embodiments and omission of any component in the embodiments may be made in the present invention without departing from the scope of the invention.

INDUSTRIAL APPLICABILITY

The image sharing assistance device according to the invention can reduce the communication load between the device and the server, and is thus suited for use in an image sharing system in which the server is configured in such a way as to be capable of receiving captured images from multiple image-capturing devices.

REFERENCE SIGNS LIST

1: image sharing assistance device, 2: first evaluation-value calculation unit, 3: environment acquisition unit, 4: second evaluation-value calculation unit, 5: storage unit, 6: transmission determination unit, 7: communication unit, 10: image-capturing device, 11: image-capturing unit, 20: server, 21: communication unit, 22: control unit, 23: image accumulation unit, 24: information accumulation unit, 25: comparison unit, 101: processing circuit, 102: memory, 103: CPU.

The invention claimed is:

1. An image sharing assistance device for acquiring data on a captured image from an imaging element and transmitting the data on the captured image to a server, comprising:
an interface circuit to acquire environmental information indicating an image-capturing environment at a time the captured image is taken;
processing circuitry
to calculate a first evaluation value related to an image quality of the captured image;
to calculate, using the environmental information, a second evaluation value related to the image-capturing environment at the time the captured image is taken; and
to determine, on a basis of the first evaluation value and the second evaluation value, whether or not the data on the captured image is to be transmitted to the server; and a communication device to transmit, when it is determined that the data on the captured image is to be transmitted to the server, the first evaluation value and the second evaluation value to the server, wherein when the processing circuitry receives a transmission request for the data on the captured image from the sever, the communication device transmits the data on the captured image to the server, the transmission request being determined by the server on a basis of the first evaluation value and the second evaluation value.

2. The image sharing assistance device of claim 1, wherein the processing circuitry determines that the data on the captured image is to be transmitted to the server, when the first evaluation value exceeds a first set value and the second evaluation value exceeds a second set value.

3. The image sharing assistance device of claim 1, further comprising a communication device to transmit, at a time the data on the captured image is transmitted to the server, the first evaluation value and the second evaluation value together with the data to the server.

4. The image sharing assistance device of claim 1, wherein the processing circuitry calculates the first evaluation value by using a first evaluation algorithm transmitted from the server.

5. The image sharing assistance device of claim 1, wherein the processing circuitry calculates the second evaluation value by using a second evaluation algorithm transmitted from the server.

6. An image sharing assistance device for acquiring data on a captured image from an imaging element and transmitting the data on the captured image to a server, comprising:
an interface circuit to acquire environmental information indicating an image-capturing environment at a time the captured image is taken;
processing circuitry
to calculate a first evaluation value related to an image quality of the captured image;
to calculate, using the environmental information, a second evaluation value related to the image-capturing environment at the time the captured image is taken; and
to determine, on a basis of at least one of the first evaluation value and the second evaluation value, whether or not the data on the captured image is to be transmitted to the server; and
a communication device to transmit, at a time the data on the captured image is transmitted to the server, the first evaluation value and the second evaluation value together with the data to the server, wherein
the communication device transmits, when it is determined that the data on the captured image is to be transmitted to the server, the first evaluation value and the second evaluation value to the server, and
when the processing circuitry receives a transmission request for the data on the captured image from the sever, the communication device transmits the data on the captured image, the first evaluation value, and the second evaluation value to the server, the transmission request being determined by the server on a basis of the first evaluation value and the second evaluation value.

7. The image sharing assistance device of claim 6, wherein the processing circuitry determines that the data on the captured image is to be transmitted to the server, when the first evaluation value exceeds a first set value or the second evaluation value exceeds a second set value.

8. The image sharing assistance device of claim 6, wherein the processing circuitry determines that the data on the captured image is to be transmitted to the server, when the first evaluation value exceeds a first set value and the second evaluation value exceeds a second set value.

9. The image sharing assistance device of claim 6, wherein the processing circuitry calculates the first evaluation value by using a first evaluation algorithm transmitted from the server.

10. The image sharing assistance device of claim 6, wherein the processing circuitry calculates the second evaluation value by using a second evaluation algorithm transmitted from the server.

11. An image sharing system, comprising:
an image sharing assistance device for acquiring data on a captured image from an imaging element and transmitting the data on the captured image to a server, comprising:
an interface circuit to acquire environmental information indicating an image-capturing environment at a time the captured image is taken; and
processing circuitry
to calculate a first evaluation value related to an image quality of the captured image;
to calculate, using the environmental information, a second evaluation value related to the image-capturing environment at the time the captured image is taken; and
to determine, on a basis of the first evaluation value and the second evaluation value, whether or not the data on the captured image is to be transmitted to the server; and
a server to transmit, on a basis of at least one of the first evaluation value and the second evaluation value, a transmission request for the data on the captured image to the image sharing assistance device.

12. An image sharing system, comprising:
an image sharing assistance device for acquiring data on a captured image from an imaging element and transmitting the data on the captured image to a server, comprising:
an interface circuit to acquire environmental information indicating an image-capturing environment at a time the captured image is taken;
processing circuitry
to calculate a first evaluation value related to an image quality of the captured image;
to calculate, using the environmental information, a second evaluation value related to the image-capturing environment at the time the captured image is taken; and
to determine, on a basis of at least one of the first evaluation value and the second evaluation value, whether or not the data on the captured image is to be transmitted to the server; and
a communication device to transmit, at a time the data on the captured image is transmitted to the server, the first evaluation value and the second evaluation value together with the data to the server; and
a server to transmit, on a basis of at least one of the first evaluation value and the second evaluation value, a transmission request for the data on the captured image to the image sharing assistance device.

13. An image sharing assistance method which is used in an image sharing assistance device for acquiring data on a captured image from an imaging element and transmitting the data on the captured image to a server, comprising:

acquiring environmental information indicating an image-capturing environment at a time the captured image is taken;

calculating a first evaluation value related to an image quality of the captured image;

calculating, using the environmental information, a second evaluation value related to the image-capturing environment at the time the captured image is taken;

determining, on a basis of at least one of the first evaluation value and the second evaluation value, whether or not the data on the captured image is to be transmitted to the server; and transmitting, at a time the data on the captured image is transmitted to the server, the first evaluation value and the second evaluation value together with the data to the server, wherein the communication device transmits, when it is determined that the data on the captured image is to be transmitted to the server, the first evaluation value and the second evaluation value to the server, and when the processing circuitry receives a transmission request for the data on the captured image from the sever, the communication device transmits the data on the captured image, the first evaluation value, and the second evaluation value to the server, the transmission request being determined by the server on a basis of the first evaluation value and the second evaluation value.

\* \* \* \* \*